United States Patent
Wells et al.

(10) Patent No.: US 10,992,677 B2
(45) Date of Patent: Apr. 27, 2021

(54) REPUTATION-BASED DEVICE REGISTRY

(71) Applicant: Toyota Motor North America, Inc., Plano, TX (US)

(72) Inventors: Andrew L. Wells, Denton, TX (US); William Daryl Cammack, Frisco, TX (US)

(73) Assignee: Toyota Motor North America, Inc., Plano, TX (US)

( * ) Notice: Subject to any disclaimer, the term of this patent is extended or adjusted under 35 U.S.C. 154(b) by 233 days.

(21) Appl. No.: 16/278,315

(22) Filed: Feb. 18, 2019

(65) Prior Publication Data

US 2020/0267151 A1  Aug. 20, 2020

(51) Int. Cl.
*H04L 29/06* (2006.01)

(52) U.S. Cl.
CPC .................... *H04L 63/10* (2013.01)

(58) Field of Classification Search
CPC .. H04L 63/10; H04L 2209/84; H04L 2209/38
USPC ............................................................ 726/3
See application file for complete search history.

(56) References Cited

U.S. PATENT DOCUMENTS

| | | |
|---|---|---|
| 2016/0275461 A1 | 9/2016 | Sprague et al. |
| 2016/0358186 A1 | 12/2016 | Radocchia et al. |
| 2017/0103468 A1 | 4/2017 | Orsini et al. |
| 2017/0302663 A1 | 10/2017 | Nainar et al. |
| 2018/0006829 A1 | 1/2018 | Kravitz et al. |
| 2018/0063099 A1 | 3/2018 | Versteeg et al. |
| 2018/0097790 A1* | 4/2018 | Caldera .................. H04L 63/08 |
| 2019/0222567 A1* | 7/2019 | Caldera ............... H04L 63/0823 |

OTHER PUBLICATIONS

Emery et al., "Atonomi—The Secure Ledger of Things" (24 pages).
Yang et al., "A blockchain-based reputation system for data credibility assessment in vehicular networks", Oct. 2017 (6 pages).

* cited by examiner

*Primary Examiner* — Tu T Nguyen
(74) *Attorney, Agent, or Firm* — Christopher G. Darrow; Darrow Mustafa PC

(57) ABSTRACT

A distributed system and method for associating reputation to device registration is disclosed herein. The systems and methods can include receiving a request for a device interaction from a requesting device. A blockchain registry can then be accessed in response to the request. An approval threshold can be prepared for an approval of the request. Input votes regarding the approval can be received from one or more acting member devices. In response to achieving the approval threshold, the device interaction can be established between the requesting device and one or more connected devices. Then, the device interaction can be recorded in the blockchain registry.

20 Claims, 5 Drawing Sheets

REPUTATION-BASED DEVICE REGISTRY

TECHNICAL FIELD

The subject matter described herein generally relates to device registration, and, more particularly, to device registration in a network using a blockchain as a mechanism for trust.

BACKGROUND

Generally, when a device wants to communicate with a network, the device first registers with the network. Device registration can be performed by accessing a central authority, such as a Dynamic Host Configuration Protocol (DHCP) server. DHCP is a service that dynamically leases Internet Protocol (IP) addresses and related IP information to devices which access the network. When using a DHCP server, the device is generally trusted (i.e., allowed access to the network) by providing a password, through payment, or other methods. DHCP servers generally function as part of a centralized system. However, centralized systems are, as the name suggests, centralized. Thus, the DHCP servers can be subject to attack from malicious sources, outage due to power or device failure, lag due to busy networks, and other difficulties. These difficulties can make the registration system embodied by the DHCP servers unavailable or otherwise faulty.

SUMMARY

Disclosed herein are systems and methods for connecting devices and registering devices in a network using a blockchain registry. In one or more implementations, a device registration system for reputation-based device communication is disclosed. The device registration system can include one or more processors, and a memory communicably coupled to the one or more processors. The memory can store a communication module including instructions that when executed by the one or more processors cause the one or more processors to receive a request for a device interaction with one or more member devices from a requesting device, and to receive an input vote from one or more acting member devices of the one or more member devices. The memory can further store an evaluation module including instructions that when executed by the one or more processors cause the one or more processors to access a blockchain registry to determine a reputation for at least one of the acting member devices, and to prepare an approval threshold for the device interaction with the one or more member devices. The memory can further store a coordination module including instructions that when executed by the one or more processors cause the one or more processors to, in response to determining the input vote satisfies the approval threshold, approve the device interaction between the requesting device and the one or more member devices, the reputation of the acting member devices being staked on the device interaction, and to record the device interaction in the blockchain registry.

In further implementations, a non-transitory computer-readable medium for reputation-based device communication is disclosed. The non-transitory computer-readable medium can store instructions that when executed by one or more processors cause the one or more processors to receive a request for a device interaction with one or more member devices from a requesting device. The non-transitory computer-readable medium can further store instructions to receive an input vote from one or more acting member devices of the one or more member devices. The non-transitory computer-readable medium can further store instructions to access a blockchain registry to determine a reputation for at least one of the acting member devices. The non-transitory computer-readable medium can further store instructions to prepare an approval threshold for the device interaction with the one or more member devices. The non-transitory computer-readable medium can further store instructions to, in response to determining the input vote satisfies the approval threshold, approve the device interaction between the requesting device and the one or more member devices, the reputation of the acting member devices being staked on the device interaction. The non-transitory computer-readable medium can further store instructions to record the device interaction in the blockchain registry.

In further implementations, a method for reputation-based device communication is disclosed. The method can include receiving a request for a device interaction with one or more member devices from a requesting device. The method can further include receiving an input vote from one or more acting member devices of the one or more member devices. The method can further include accessing a blockchain registry to determine a reputation for at least one of the acting member devices. The method can further include preparing an approval threshold for the device interaction with the one or more member devices. The method can further include, in response to determining the input vote satisfies the approval threshold, approving the device interaction between the requesting device and the one or more member devices, the reputation of the acting member devices being staked on the device interaction. The method can further include recording the device interaction in the blockchain registry.

BRIEF DESCRIPTION OF THE DRAWINGS

So that the manner in which the above-recited features of the present disclosure can be understood in detail, a more particular description of the disclosure, briefly summarized above, may be had by reference to the implementations, some of which are illustrated in the appended drawings. It is to be noted, however, that the appended drawings illustrate only typical implementations of this disclosure and are therefore not to be considered limiting of its scope. The disclosure may admit to other equally effective implementations.

To facilitate understanding, identical reference numerals have been used, wherever possible, to designate identical elements that are common to the figures. Additionally, elements of one or more implementations may be advantageously adapted for utilization in other implementations described herein.

DETAILED DESCRIPTION

Figure 1:
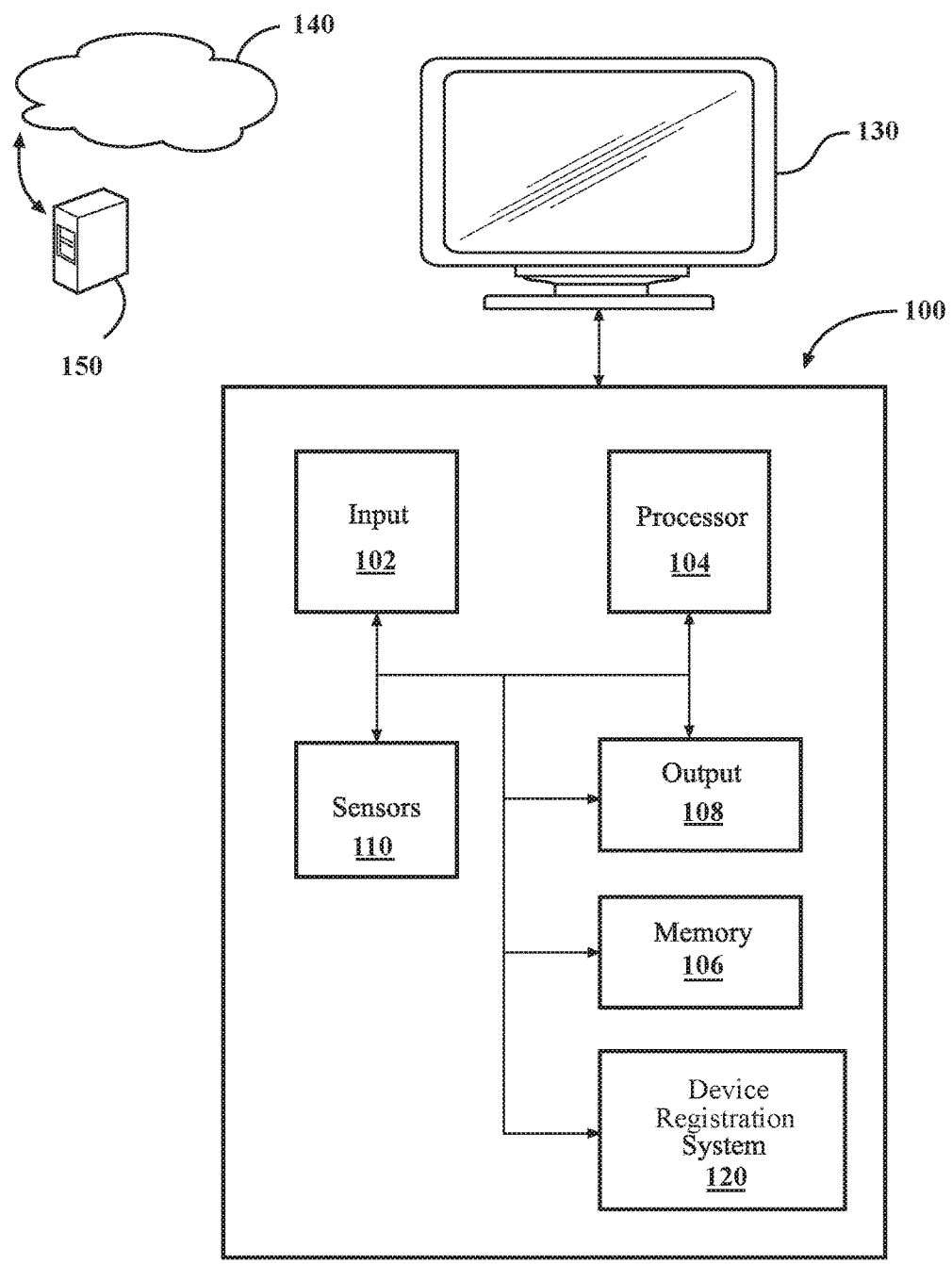
FIG. 1 is a block diagram of a computing device incorporating a device registration system, according to implementations described herein.

The implementations disclosed herein generally relate to systems and methods for implementing a blockchain registry of devices including a reputation system. In one or more approaches as discussed herein, a blockchain can be a system that securely and immutably stores data. In general, blockchains create a history of transactions in a series of blocks where each block comprises a mathematical summary, called a hash, of the previous block. The hashes are one-way, meaning non-reversible. Thus, the hashes can make the blockchain secure against tampering. The system uses the relationships between blocks and hashes to form a secure chain where subsequent blocks in a blockchain effectively secure prior blocks through storing the hash/identifier of the prior block while also incorporating the hash as an integral aspect of the current block. The blockchain registry, in one approach, can store registry information within blocks of a blockchain, as well as tiered and correlated branches about various devices, manufacturers, member devices, and other information relevant to a registration transaction. Member devices, as used herein, generally refers to devices which are part of the network.

The blockchain registry can facilitate securing communications between one or more member devices and a requesting device because of the inherent tamper resistance and distribution. The one or more member devices are devices which are already approved for communication with other devices as part of the blockchain registry. The requesting device is a device that is not otherwise approved for access to member devices as recorded on the blockchain registry. The requesting device can be approved for access to the network by one or more acting member devices. The acting member devices are member devices which provide an input for the addition of the requesting device. The acting member devices each provide an input, the input being either positive or negative and with respect to their reputation in the network (i.e., the acting member reputation). The system then determines if the input received is sufficient to add the new device to the network (e.g., the approval threshold). Once approved, the disclosed system adds the new device to the network and communications from the newly added device are generally considered secure and trusted because of the trusted nature of the blockchain and the acting member reputation of the acting member device. To add a new device (also referred to as a "requesting device") to the registry, an acting member device can provide input regarding the requesting device. Examples of possible acting member devices can include a control system for a company/original equipment manufacturer (OEM) with a trusted reputation, a device with a trusted reputation, or others.

The input can be restricted to or otherwise related to proof of stake. Proof of stake is a system which uses a network participant's level of investment in or involvement with the network (i.e., their stake in the network), such as the reputation of a member device, to limit or control what that network participant can add to the network. In the present system, network participants are the member devices. A higher level of investment by the member device can lead to the ability to add more devices to the network. Member device can gain reputation by involvement with the network. By approving or voting to approve a requesting device that requests to communicate with the network, the acting member device can stake a certain amount of reputation on the behavior of the requesting device. In further implementations, proof of stake can be used to limit the number of requesting devices that can be added by an acting member device (e.g., the amount of reputation, as a percentage of all reputation available, can be equal to the number or percentage of requesting devices that can be added).

The acting member device can then provide input regarding the requesting device in a vote of confidence for the new device. The input can be received with relation to member device reputation within the network. Should the requesting device turn out to be malicious, the acting member device loses accrued member device reputation, or is otherwise negatively compensated in some way. Using the member device reputation and/or other forms of negative compensation, the disclosed system can dissuade actively supporting the addition of malicious requesting devices. If the requesting device is found to not be malicious over a period of time, then the system improves/adds points to the reputation of the acting member device. Various entities that are adding devices through this modified proof of stake mechanism may gain stake (i.e., reputation) through various mechanisms such as industry reputation (e.g., a desirable partner company supporting the devices in vehicles as valid internet of things (IoT) devices), staking actual currency, or simply through registering valid devices (e.g., small company or single person registering devices).

Once the disclosed system approves the requesting device, the disclosed system can then treat the approved requesting device as secured and participating in the blockchain registry. Additionally, the reputation of an approved requesting device can be included in communications from the device in order to create reputation continuity. In another implementation, an identifier of the acting member device can be provided in communications from the approved requesting device. The identifier of the acting member device and/or reputation of the approved requesting device can allow other devices in communication to assess a degree of trust for the device from which the other devices can actively trust/distrust/mitigate communications with the device. That is, the other member devices can decide whether to trust the approved requesting device according to reputation level of the approved requesting device and/or the reputation of the acting member device. If the other member device chooses not to trust the approved member device, the other member device can control connection with the approved member device, such as by denying communication with the approved requesting device or selectively throttling interactions. More generally, the blockchain registry can be employed to determine whether communications from different devices can be trusted. In this way, the blockchain registry improves the security of communications with requesting devices. Further, the blockchain registry creates mechanisms for trusting communications to avoid malicious intervention. The implementations disclosed herein are more clearly described with reference to the figures below.

Referring to FIG. 1, an example of a computing device 100 having the device registration system 120 is illustrated. The computing device 100 can receive the blockchain registry as part of the device registration system 120. The computing device 100 can be any appropriate type of computing device such as, but not limited to, a server, a personal computer (PC), workstation, embedded computer, or stand-alone device with a computational unit, such as a microprocessor, DSP (digital signal processor), FPGA (field programmable gate array), or ASIC (application-specific integrated circuit).

The computing device 100 can include a device registration system 120 or capabilities to support or interact with the device registration system 120, and thus benefits from the functionality discussed herein. While arrangements will be described herein with respect to automobiles, it will be understood that implementations are not limited to automobiles. The autonomous device can be any form of machination capable of independently or semi-independently interacting with a simulated environment, including a robot, a mechanical arm, a vehicle, and others. Instances of the vehicle, as used throughout, are equally applicable to any device capable of incorporating the systems or methods described herein.

The computing device 100 also includes various elements. It will be understood that in various implementations it may not be necessary for the computing device 100 to have all of the elements shown in FIG. 1. The computing device 100 can have any combination of the various elements shown in FIG. 1. Further, the computing device 100 can have additional elements to those shown in FIG. 1. In some arrangements, the computing device 100 may be implemented without one or more of the elements shown in FIG. 1. While the various elements are shown as being located within the computing device 100 in FIG. 1, it will be understood that one or more of these elements can be located external to the computing device 100. Further, the elements shown may be physically separated by large distances.

Some of the possible elements of the computing device 100 are shown in FIG. 1 and will be described along with subsequent figures. However, a description of many of the elements in FIG. 1 will be provided after the discussion of FIGS. 2-5 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the implementations described herein. Those of skill in the art, however, will understand that the implementations described herein may be practiced using various combinations of these elements.

In implementations described herein, the computing device 100 can be in communication with a computing device 100. The computing device 100 or other device being in communication with the computing device 100 refers to any forms of direct or indirect communication between the computing device 100 and the computing device 100, including direct wired communication, communication through one or more intermediary computing devices, communication through the cloud, or combinations thereof. The communication can be performed through the use of a variety of wired or wireless networks. In some implementations, the computing device 100 is a server which is remote from the computing device 100. In further implementations, the computing device 100 can be integrated into the computing device 100, such as an embedded system. The computing device 100 can include a device registration system 120 that is implemented to perform methods and other functions as disclosed herein.

Figure 2:
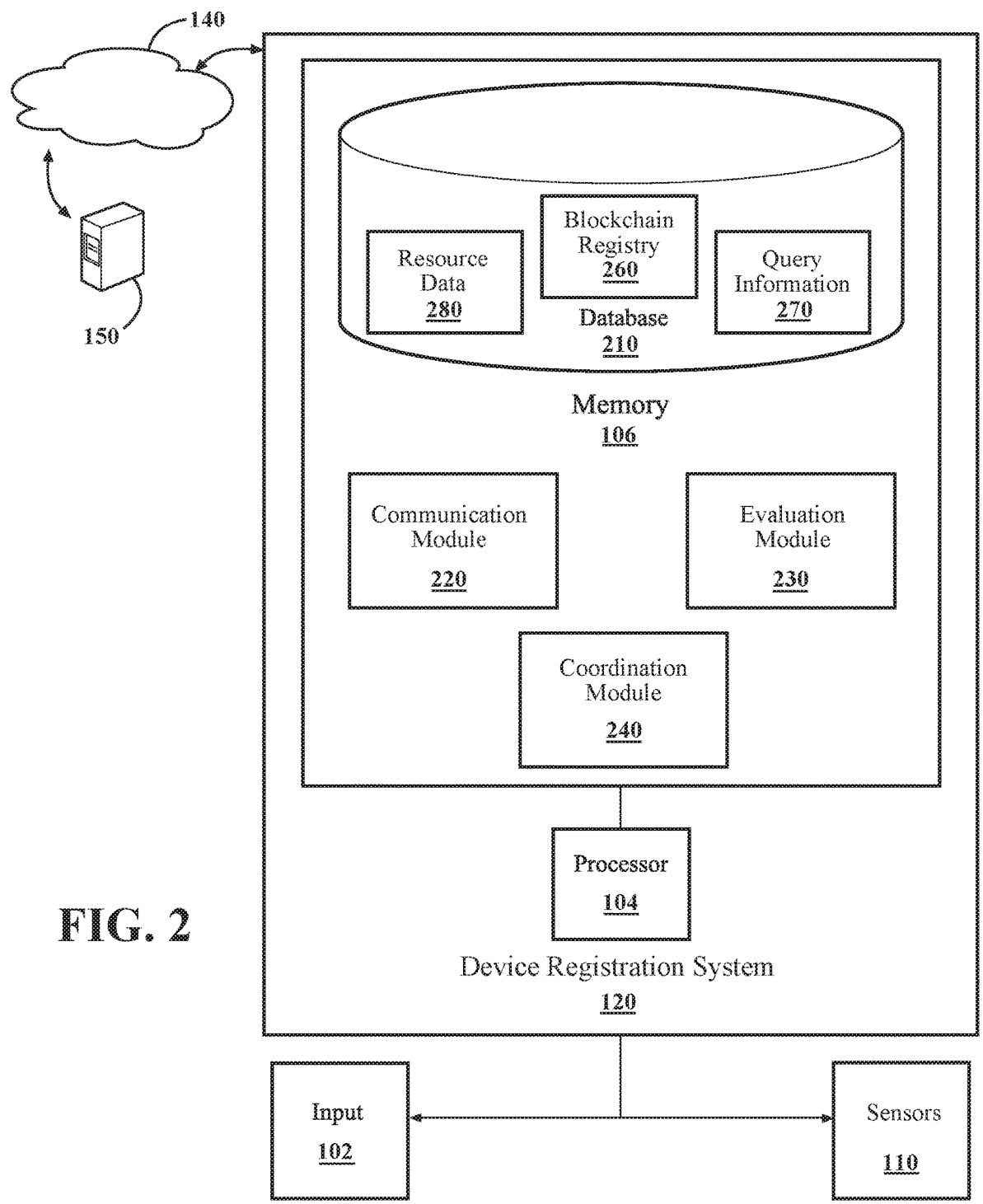
FIG. 2 is a device registration system for reputation-based device communication, according to one or more implementations.

The device registration system 120 is more clearly described with reference to FIG. 2. The device registration system 120 can include one or more modules to receive one or more requests for a device interaction from requesting devices, evaluate approval for said requests, and coordinate connection between the one or more requesting devices and the one or more connected devices. The device registration system 120 is shown as including a processor 104 from the computing device 100, depicted in FIG. 2. Accordingly, the processor 104 can be a part of the device registration system 120, the device registration system 120 can include a separate processor from the processor 104 of the computing device 100, or the device registration system 120 can access the processor 104 through a data bus or another communication path. In one implementation, the device registration system 120 includes the memory 106 that stores the communication module 220, the evaluation module 230, and the coordination module 240. The memory 106 is a Random Access Memory (RAM), Read-Only Memory (ROM), a hard disk drive, a flash memory, or other suitable memory for storing the modules 220, 230, and 240. The modules 220, 230, and 240 are, for example, computer-readable instructions that when executed by the processor 104, cause the processor 104 to perform the various functions disclosed herein.

The device registration system 120 can incorporate one or more acting member devices in approving the device interaction for the requesting device. Device interactions generally relate to any type of communication or interaction between one or more devices. Acting member devices, as used herein, refers to one or more systems and/or devices which can provide input on the connection request. Examples of one or more systems and/or devices which can provide input can include manufacturers (e.g., a control system or monitoring system for device makers, vehicle makers, network owners, or others), member devices, third-party evaluators (e.g., a monitoring system designed for network and device evaluation), and others. Member devices, as used herein, refer to the one or more devices which are connected to the network (i.e., devices in connection with and already trusted by the network). Member devices can include any network-connected computer or vehicle devices, remote or directly connected to the network. Member devices in the context of a vehicle can include sensors, communications components, control systems, steering systems, braking system components, and/or other components which can communicate with or engage with a device on a network.

The communication module 220 generally includes instructions that function to control the processor 104 to receive a request for a device interaction with one or more member devices from a requesting device. The device interaction can include one or more types of interaction or communication between two devices, such as adhoc communication, communication over a network, communication with a router or other network control device, communication with a device as an intermediary for further communication, or others as appropriate. The requesting device can attempt to communicate through one or more connection types, such as a wired connection or a wireless connection. The requesting device can attempt to interact with the device impromptu or in response to a query. In one or more implementations, the requesting device can send out a broadcast packet announcing the presence/availability of the requesting device on the network and that also requests access to the network.

The communication module 220 can then store the request for network access or for connection to a device which is part of the network (i.e., a connection request) and related information based on the status of the requesting device. To store the request for network connection, the communication module 220 can modify the blockchain registry 260. The blockchain registry 260 can include a blockchain database. The blockchain database is a file storage system that includes blocks storing selected data (e.g., requests, histories, etc.) and identifiers of the blocks (e.g., hashes). The communication module 220 configures the blocks and the related hashes such that the blockchain database can be shared across the network while maintaining the integrity of said database. The blocks of the blockchain database are discrete blocks of data including information about the one or more acting member devices, the one or more connected devices, one or more attempts at connection to the network, or other communication-related information.

When the device registration system 120 creates a new block for the blockchain, the system 120 as a member in the blockchain hashes the block. The device registration system 120 hashes the block as a secure mechanism for identifying and integrating the particular block in the blockchain. Hashing is a form of cryptographic security that characterizes the block in a single compact string. In some implementations, the block can be hashed with respect to existing data in the blockchain including a hash of a prior block in order to link subsequent blocks together. Thus, the string uniquely identifies the block and is secure in that the hash function is one-way (i.e., irreversible) while also being linked/stored in a subsequent block. The block and the hash are then forwarded to other member devices, which then verify the hash and, once verified, added to the existing copy of the blockchain existing with the member device. Thus, the block can be distributed to the other member devices for addition in the blockchain registry 260 throughout the network for later use. Alternatively, the information embodied within the block is communicated within a distributed network of the blockchain, and, thus, the member nodes independently assemble the block and verify contents of the block through use of the hash.

The communication module 220 can further include instructions to receive an input vote from the acting member devices of the member devices. The input vote, as used herein, relates to responses given by the one or more acting member devices to the connection request. In some implementations, the communication module 220 can send a request for input to the member devices. In response to the request, the member devices can provide the input vote. In instances where the acting member device attempted to connect the requesting device to the network and/or connected directly with the requesting device, the input vote of the acting member device can be taken from the connection. Examples of the input votes can include approving the request, denying the request, conditionally approving/denying the request, requests for further information, accepting/denying portions of the request, or others. The input votes can be interactive inputs (inputs given based on a set of parameters and/or with direct input from the one or more acting member devices), autonomous inputs (inputs related to a program or system), or other forms of input as desired. The input votes can be associated with and weighted by the member device reputation of the acting member devices. The member device reputation, as used herein, relates to how trusted the acting member device is within the network. The member device reputation can include previous approval of malicious requesting devices, previous approval of benign requesting devices, industry status of the manufacturer, number of related devices in the network, and others which tend to indicate the trustworthiness of the acting member device.

The evaluation module 230 can generally include instructions that function to control the processor 104 to access a blockchain registry in response to the connection request. The blockchain registry 260 can contain information regarding one or more connected devices and one or more acting member devices for the connected devices. The evaluation module 230 can query a blockchain registry 260 to determine if the requesting device has pre-established network connection. The blockchain registry 260 is a blockchain-based collection of information regarding network control and monitoring. Examples of information regarding network control and monitoring can include the network data for one or more connected devices and/or one or more acting member devices, previous information related to successful attempts at connection or failed attempts from one or more requesting devices, member device reputation, device reputation, and others. Member device reputation can indicate approval or denial of device requests. Device reputation can reflect the behavior of the device on the network. The blockchain registry 260 can be stored in a centralized location, such as the server 150, or distributed across a network, such as a network 140, to one or more computing devices. In one implementation, the blockchain registry 260 can be stored as part of one or more of the connected devices.

In further implementations, the evaluation module 230 can include instructions to reference requesting device history, such as from a blockchain registry. In one implementation, the evaluation module 230 can determine that the requesting device has previously connected with the network (or connected with members thereof) and store the request for the device interaction as part of the previous connection. The evaluation module 230 can store the request for the device interaction as a block in part of a sub-chain from the block establishing previous connection. In another implementation, the communication module 220 can determine that the requesting device has never connected with the network. The request for the device interaction can further be stored as part of query information 270, shown as part of the database 210. In one or more implementations, the query information 270 or components thereof are incorporated into the blockchain registry 260 based on approval-related information as described herein. The communication module 220 can then forward the connection request from the requesting device to the evaluation module 230.

The evaluation module 230 can further include instructions to access the blockchain registry to select one or more member devices as the acting member devices in relation to a specific connection request. In one implementation, the evaluation module 230 can create a subset of acting member devices which can provide an input vote for the network. In another implementation, the evaluation module 230 can determine a subset of connected devices which are affected by or could have input on the approval of the requesting device. The blockchain registry 260 can further include requirements or limitations as previously established by the acting member devices and/or the connected devices. The evaluation module 230 can further access resource data 282 to determine the capability of the network to support the requesting device. This information or data can be stored by the evaluation module 230 in the query information 270 shown here as part of the database 210.

In further implementations, the evaluation module 230 can include proof of stake in the approval of the connection request. The member devices can have a device reputation which is accumulated in the network. The device reputation can be derived from a variety of interactions with the network, including number of related devices on the network, manufacturer trust levels, longevity on the network, associated reputation from other networks, or other mechanisms. The device reputation for the member devices can be used as proof of stake in the network, where greater device reputation equals a greater stake in the network. The evaluation module 230 can then apply the device reputation (i.e., the proof of stake) to control the capabilities of the member device in adding new devices. In some implementations, the evaluation module 230 can restrict adding of new device and/or device types to the network unless the acting member device has a reputation above a certain threshold. In further implementations, the evaluation module 230 can control the number of new devices with relation to the device reputation of the acting member device. In yet further implementations, the evaluation module 230 can apply the device reputation as weight for a vote, as part of a voting system. The device registration system 120 can further use behavior of the requesting device in determining if the stake of the acting member device is lost or if stake is gained.

The evaluation module 230 can further include instructions to create an approval threshold for the approval of the connection request. The approval threshold, as used herein, refers to the one or more requirements placed by the network, one or more connected devices, and/or one or more acting member devices on network connection from one or more requesting devices. In one implementation, the approval threshold can include the composition threshold, such as a certain number of the one or more acting member devices must approve the connection request before the requesting device can connect to the network. In another implementation, the approval threshold can include a reputation threshold, such as requiring the acting member device to have a certain reputation level before they can approve the requesting device for access to the network. In some implementations, the approval threshold incorporates the proof of stake described above, such that having a greater stake in the network gives greater weight in approving a The approval threshold can further include network limitations as related to the connection request. Network limitations can include network requirements for connected devices, network requirements for the requesting device, network settings established by the connected devices (e.g., a group vote by the connected devices to limit certain types of activity on the network), or others. The network limitations can be stored as part of the resource data 280, as shown in the database 210. The evaluation module 230 can access the resource data 280 to determine a variety of network requirements and network resources as allocated to currently connected devices in determining the approval threshold for the requesting device.

The approval threshold can further include individualized restrictions for the connected devices. The individualized restrictions are parameters which are established by the connected devices individually or as subgroups which must be met before the connected device can be accessed by a requesting device. The individualized restrictions on the approval threshold can be maintained even if the requesting device is approved for network access. In one or more examples, the requesting device can be approved for general network access but not access to one or more specific connected devices based on the individualized restrictions. Individualized restrictions can include reputation level for the requesting device, reputation level for the one or more acting member devices approving the requested device, number of previous attempts at network access, or others which can be selected for individual devices or groups of devices. Individualized restrictions can be stored as part of the blockchain registry 260, shown in the database 210.

The evaluation module 230 can further include instructions to compare the input vote against the approval threshold in light of the reputation. In one or more implementations, the input votes can indicate approval for the requesting device by voting member devices. The evaluation module 230 can compare the input votes to the approval threshold to determine if the requesting device satisfies requirements to access to the network. In one or more implementations, the input votes, including both the number of inputs which indicate approval and the reputation of the acting member device indicating approval, can be applied to determine if the approval threshold has been met. The evaluation module 230 can assign the input votes a general value based on the involvement of the acting member device, such as member device reputation, member device longevity in the network, a specific stake (e.g., a "bet" of something of value within the network, which can be lost or built upon) placed on the successful integration of the device, or others. In one general example, we assume that the approval threshold has been set to an arbitrary number of twenty (20), each input of approval is equal to a value of one (1), and all systems have a reputation of two (2). In this example, the coordination module 240 can consider the approval threshold as being met if any combination of a number of acting member devices and reputation reaches or exceeds twenty (20). The numbers used in this example are not intended to be limiting, as a specific number can be more or less, including fractional numbers, variables, or others, as will be understood by one skilled in the art.

In further implementations, inputs denying access (e.g., an input of denial with prejudice) can be weighed against inputs approving access. The input of denial with prejudice can be given a value which is weighed against the input of approval in determining whether the connection request is approved. Using the general example from above, with the approval threshold being set to an arbitrary number of twenty (20), each input of approval is equal to a value of one (1), and all systems have a reputation of two (2), we can further assume that each input of denial with prejudice is equal to a value of 0.5. In this example, the coordination module 240 can consider the approval threshold as being met if any combination of a number of approving acting member devices and reputation reaches or exceeds twenty (20), after subtracting the denying acting member devices. As such, an intentional denial of access by the acting member device can result in denying the connection request, even if the connection request would otherwise have been approved by the approving acting member devices.

The coordination module 240 can further include instructions to, in response to achieving the approval threshold, approve the device interaction between the requesting device and the one or more member devices, the reputation of the acting member devices being staked on the device interaction. The coordination module 240 can, through instructions to the processor 104, subsequently allow the requesting device to connect to the network and/or to one of the member devices which are part of the network. The coordination module 240 can then assign an IP address, set device restrictions based on network restrictions, establish connection limitation based on individualized restrictions, and/or others to create or allow the connection based on the type of connection achieved. The coordination module 240 can further inform the connected devices of the approved requesting device. Though the requesting device is now connected to the network at this point, we continue to refer to it as a requesting device for continuity of description.

Once approval is determined, the coordination module 240 can then, through instructions to the processor 104, record the device interaction in a block for the blockchain registry 260. The block can include the details of the interaction, including the input votes, the acting member devices, and any limitations of the connection. The coordination module 240 can record these details on one or more block, as appropriate in light of the blockchain structure or as desired. The block or blocks can be then be hashed, distributed to others in the network, and verified for integration into the blockchain registry 260. The modified blockchain registry 260 can then be inspected, approved, and concatenated with or resolved against other blockchain registries 260 in the network to maintain the integrity of the distributed registry.

In one or more further implementations, the coordination module 240 can include instructions to store the inputs approving access or denying access with prejudice as part of the member device reputation in the blockchain registry 260. The member device reputation can include both the inputs which approve access by a requesting device and the number of overall approvals received from the acting member device. In one or more implementations, member device reputation can be negatively affected by a large number of overall approvals, approving access to a malicious requesting device, combinations thereof, or others. The member device reputation of the acting member device which approves access to a malicious requesting device can be negatively affected, such as by reducing reputation affecting a level of electronic currency, limiting numbers of denial with prejudice that the system can present, or others. Conversely, the member device reputation of the acting member device which approves access to a benign requesting device can be positively affected, such as by increasing reputation, increasing electronic currency, offering special weight to certain types of approvals, or others.

In one or more further implementations, the inputs denying access with prejudice can help or damage member device reputation in a similar manner. Inputs denying access with prejudice can be considered the negative of inputs approving access. As such, the member device reputation of the acting member device which denies access with prejudice to a benign requesting device can be negatively affected, such as by reducing reputation affecting a level of electronic currency, limiting numbers of denial with prejudice that the system can present, or others. Conversely, the member device reputation of the acting member device which denies access with prejudice to a malicious requesting device can be positively affected, such as by increasing reputation, increasing electronic currency, offering special weight to certain types of denials, or others.

In some instances, an acting member device can be determined to be especially capable regarding determining malicious or benign behavior. In some cases, an acting member device can be especially adept regarding specific types of requesting devices or specific classes of devices. As such, these acting member devices can be offered special weight regarding their determinations of the specific types or specific classes of requesting devices. The acting member device can be determined to be especially adept through an assessment of their historical inputs, such as through a higher than normal percentile of positive or negative input, as compared to other acting member devices. The special weight can be in the form of significantly increased vote value, veto power, trial approvals, or other alternative forms of approval or denial not generally allowed to other acting member devices.

In one or more further implementations, the coordination module 240 can further include instructions to receive information regarding the device behavior. The coordination module 240 can use one or more sources to collect the information, such as sensors, collected network traffic from the requesting device, reports from other connected devices, or other indications of benign or malicious activity. In one or more implementations, the coordination module 240 can receive information from a vehicle network regarding device behavior. The coordination module 240 can then assess the device behavior, both positive and negative, and determine the device disposition. The device disposition is a generalized statement or numerical indicator which indicates an assessment of the overall behavior of the device. The device disposition can be network specific or generalized to all behavior from the device as known to the blockchain registry 260. The device disposition can be associated with a reputation score both for the device (e.g., device reputation) and for the acting member device which approved the device (e.g., member device reputation). The device reputation can be specific to the requesting device, device class, devices from a specific manufacturer, devices interacting with a specific manufacturer (e.g., a device from manufacturer X running using a driver or operating system (OS) from manufacturer Y or with components from manufacturer Z), or others.

In one or more further implementations, the coordination module 240 can include instructions to provide compensation to the one or more acting member devices in light of device disposition and status of their input. The coordination module 240 can use the device disposition to determine whether the compensation provided should be a negative compensation or positive compensation as described above. The compensation described herein can include electronic currency, reputation, special control levels over the network, or others. In one implementation, the compensation can be proportional to the type of input, viewing the use of reputation as a wager on the maliciousness of the requesting device. In another implementation, the compensation can be proportional to the resulting device disposition, where the level of negativity or positivity of the device disposition affects the quantity of compensation, such as reputation gains or losses.

Figure 3:
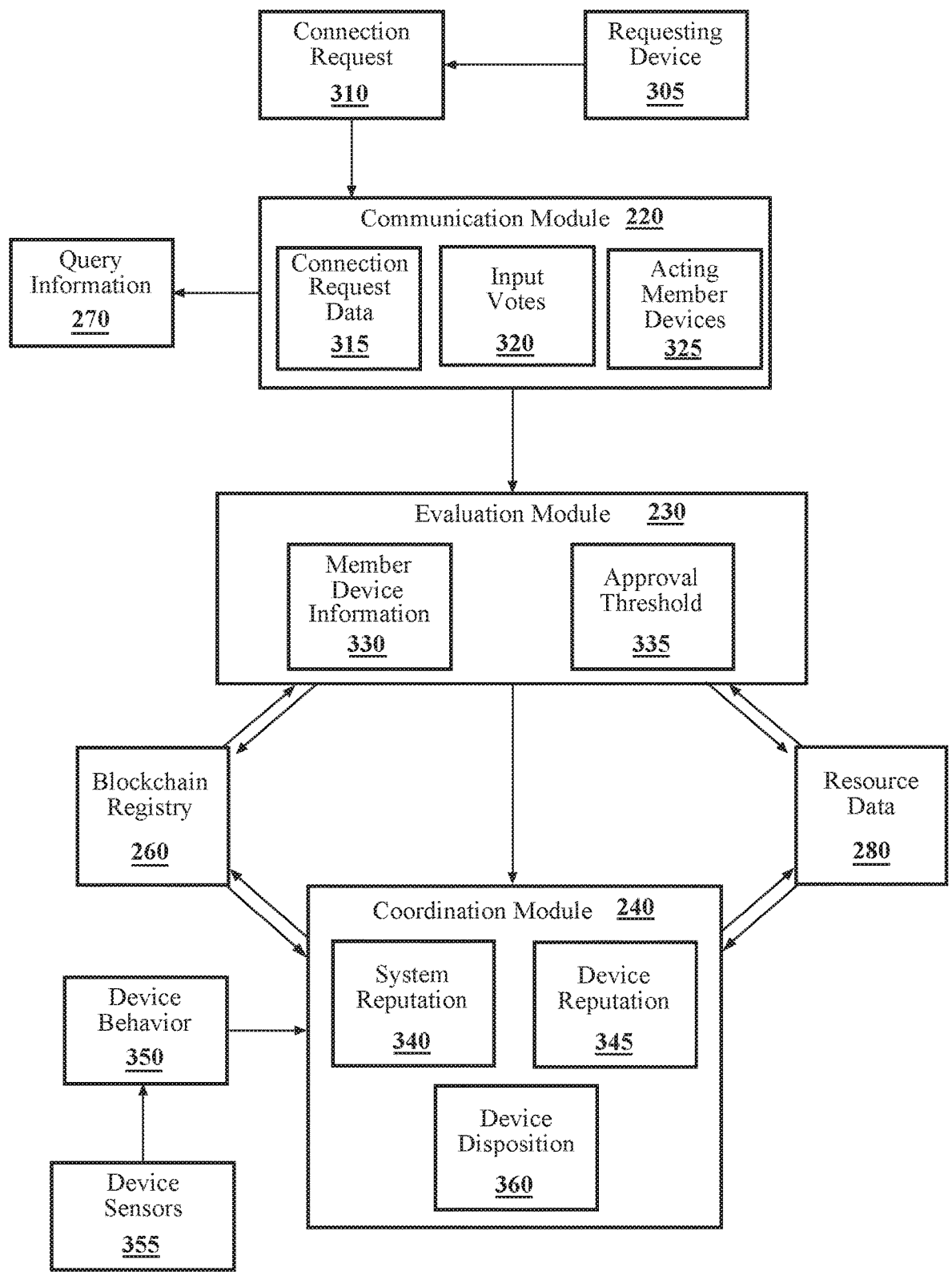
FIG. 3 is a schematic of the device registration system, according to one or more implementations.

FIG. 3 is a schematic of the device registration system 120, according to one or more implementations. The device registration system 120 can be configured to receive a connection request, solicit input from acting member devices, and coordinate acceptance or denial of the requesting device to the network based on a blockchain registry. In some examples, the device registration system 120 can relate reputations of acting member devices to the requesting devices. As such, the device registration system 120 improves access control to the network by controlling access to devices on the network and/or to the network itself based on a stake of a promoting member device in the network. In this way, the device registration system 120 can minimizing malicious activity from requesting devices.

The device registration system 120 begins with the requesting device 305 providing a connection request 310 to the communication module 220. The requesting device 305 can be any number of devices in connection with the device registration system 120, such as one or more network-connected components of the computing device 100. The connection request 310 can be one or more packets of information containing data related to the requesting device 305 registering with a network, such as the network 140 described with reference to FIG. 2, and/or directly connecting with a device which is part of the network. The communication module 220 receives the connection request 310 and produces connection request data 315. The connection request data 315 includes the connection request 310 as well as information about the connection request 310 and about the requesting device 305. In one or more implementations, the connection request data 315 includes information regarding timing, device manufacturer, device type, one or more faults detected in the requesting device 305, or other information related to the requesting device 305. The communication module 220 can include instructions to receive input votes 320 from the acting member devices 325. The input votes 320 can include varying degrees of approval or denial from the acting member devices 325 related to the connection request 310. The communication module 220 can then forward the connection request data 315 and the input votes 320 to the query information 270. The query information 270 can further include information about previous connections or requests from the requesting device 305. The communication module 220 can then send appropriate packets of information related to the connection request 310 to the evaluation module 230.

The evaluation module 230 can include instructions to, upon receiving the connection request data 315, access the blockchain registry 260. The blockchain registry 260 can contain member device information 330 regarding one or more acting member devices 325 as selected from one or more member devices. A selection of the member device information 330 for the one or more acting member devices 325 can be produced for evaluation of the connection request 310 and the input votes 320 by the evaluation module 230. The one or more acting member devices 325 can be selected from one or more of the member devices, one or more device manufacturers, one or more secondary devices, or other devices, systems, or systems capable of or configured to provide input regarding the connection request 310. The evaluation module 230 can further produce an approval threshold 335 for the input votes 320. The evaluation module 230 can reference the resource data 280, regarding network resources and/or the network limitations. As well, the evaluation module 230 can query the member devices regarding individual limitations, reputation requirements, and other information necessary for appropriately establishing the approval threshold 335. The above information, including the member device information 330, can then be incorporated into the approval threshold 335. The evaluation module 230 can then compare the input votes 320 to approval threshold 335, where the approval threshold 335 establishes the parameters of approval with respect to the input votes and other factors of the acting member devices 325. The approval threshold 335, the input votes 320 and the comparison data is then forwarded to the coordination module 240.

The coordination module 240 can include instructions to access the blockchain registry 260 to determine or elicit information regarding a member device reputation 340 and a device reputation 345. In one or more implementations, the blockchain registry 260 can contain information regarding the device reputation 345 and/or a device disposition 360. The coordination module 240 can further reference the resource data 280 to determine the capability of the network to support the requesting device 305 as well as other factors related to the requesting device 305 interacting with the one or more member devices. If the requirements of the approval threshold 335 are met by the input votes 320, the coordination module 240 can then connect the requesting device 305 to the network.

The coordination module 240 can further collect information regarding the device reputation 345 and/or the device disposition 360. One or more device sensors 355 can report information regarding a device behavior 350. The one or more device sensors 355 can be selected from traditional or nontraditional sensors. Traditional sensors are intended to indicate a device capable of producing information based on being designed to produce that information, such as collecting information about sound from a microphone. Nontraditional sensors, as used herein, indicate a device capable of producing information as extrapolated from the device's behavior, such as collecting information about precipitation from windshield wipers being turned on. In one example, the one or more device sensors 355 can include detecting the manipulation of exploits on the network. In another example, the one or more device sensors 355 can include historical information of the effects of the interaction of the requesting device 305 with the one or more member devices over a period of time.

The device behavior 350 can include one or more actions or activities of the requesting device 305 as determined based on the interaction of the requesting device 305 with the network. The device behavior 350 can include malicious activity, benign activity, or other activity related to a determination of trustworthiness for the requesting device 305. The device behavior 350 can be incorporated into the device reputation 345. As well, the device behavior 350 can be used in a determination of the device disposition 360. The device disposition 360 is a generalized indication of the overall activity of the requesting device 305 as related to the network. In one or more embodiments, the device disposition 360 can include establishing the requesting device 305 as a malicious device, a benign device, or other indications of generalized activity on the network.

As such the device registration system 120 can provide a mechanism of reputation-based device communication. The device registration system 120 can utilize a blockchain registry, thus creating an immutable storage system. The blockchain registry can be distributed to both prevent bottlenecks in transmission and ensure the integrity of the registry. Further, the device registration system 120 can rely on input from one or more acting member devices in determining acceptance of the request for device interaction. As such, the device registration system 120 can associate trust and/or reputation of the one or more acting member devices with one or more requesting devices.

Figure 4:
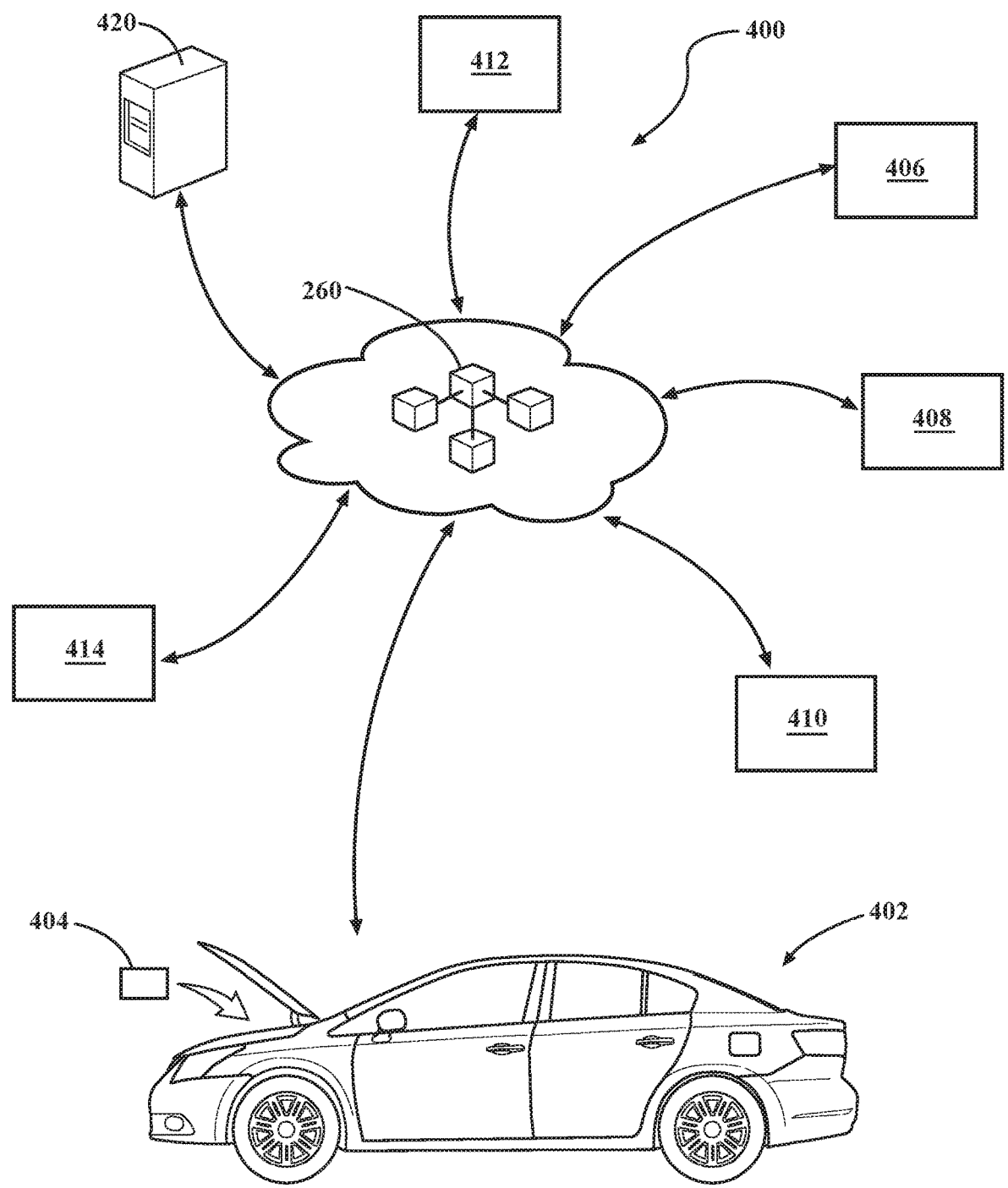
FIG. 4 is a depiction of an exemplary network incorporating the device registration system, according to one or more implementations.

FIG. 4 is a depiction of an exemplary network incorporating the device registration system, according to one or more implementations. Shown here, a network 400 is attached to a number of devices, such as a vehicle 402 receiving a first requesting device 404, a first member device 406, a second member device 408, a third member device 410, a second requesting device 412, and an external system 414. The network 400 can further be connected with a computing device 420. The computing device 420 can be substantially similar to the computing device 100, described with reference to FIG. 2. The computing device 420 can incorporate the device registration system 120 or one or more components thereof. The computing device 420 is depicted here as a remote computing device. The computing device 420 can be an independent computing device or can be incorporated into one or more devices shown here, such as the member devices 406, 408, 410, and the vehicle 402. In further embodiments, the computing device 420 can be composed of one or more computing devices as described above with reference to FIG. 1.

The first member device 406, the second member device 408, and the third member device 410 can be connected to the network 400 through a wired or wireless connection. In one implementation, the first member device 406, the second member device 408, and the third member device 410 can be integrated into the vehicle 402. The first requesting device 404 and the second requesting device 412 can each be connected to the network 400 through a wired or wireless connection. In this embodiment, the first requesting device 404 is shown as directly connecting to the vehicle 402 (e.g., a wired connection) and the second requesting device 412 is depicted as being connected remotely (e.g., a wireless connection). The external system 414 can be a system designed to evaluate member devices or requesting devices on the network 400. The network 400 is further depicted as including the blockchain registry 260. Though the blockchain registry 260 is depicted as being centrally located in the network, it is understood that the blockchain registry 260 can include one or more copies distributed to one or more devices in the network 400 including but not limited to the one or more devices shown here. Though the network 400 is depicted as being remote from the one or more devices connected with the network 400, the network 400 can be integrated into one or more of the devices depicted here. In one implementation, the network 400 is a controller area network (CAN) bus in the vehicle 402.

The vehicle 402 is shown here receiving the first requesting device 404. As used herein, a "vehicle" is any form of motorized transport. In one or more implementations, the vehicle 402 can be an automobile. In some implementations, the vehicle 402 may be any other form of motorized transport that, for example, can operate autonomously, semi-autonomously, or manually by an in-vehicle operator. The vehicle 402 can include the device registration system 120 or capabilities to support or interact with the device registration system 120, and thus benefits from the functionality discussed herein. While arrangements will be described herein with respect to automobiles, it will be understood that implementations are not limited to automobiles, but any form of vehicle or device capable of being occupied. Instances of the vehicle, as used throughout, are equally applicable to any device capable of incorporating the systems or methods described herein.

The vehicle 402 can further be in communication with the network 400 and one or more devices connected to said network 400, such as the computing device 420. The first requesting device 404 can be one of a number of devices which can connect to the network of the vehicle 402. Examples of the first requesting device 404 can include a computing device, a sensor, a personal assistant device (e.g., a smartphone, a tablet, or others), IoT devices, or other devices which can connect with the network of the vehicle 402. The first requesting device 404 can then request access to the network 400 through the vehicle 402. The second requesting device 412 can similarly request a device interaction to the vehicle 402 through wireless communication. Information regarding the first requesting device 404 and the second requesting device 412, such as physical information, information related to the network request, origin, and others relevant to the request or the device, can be recorded by the device registration system 120 as part of the query information 270.

The vehicle 402, using the device registration system 120, can then access the blockchain registry 260 to determine if the first requesting device 404 and/or the second requesting device 412 has any previous history with the network 400. As well, the device registration system 120 can select one or more acting member devices to evaluate the connection request from the first requesting device 404 and the second requesting device 412. The device registration system 120 can include proof of stake in the selection of member devices. The device reputation for the acting member devices can be used as proof of stake in the network, where greater device reputation equals a greater stake in the network. The device registration system 120 can then apply the device reputation (i.e., the proof of stake) to control the capabilities of the member device in adding new devices. In some implementations, the device registration system 120 can restrict adding of new device and/or device types to the network unless the acting member device has a reputation above a certain threshold. In this example, the device registration system 120 selects the first member device 406, the second member device 408, and the external system 414 as the acting member devices for the first requesting device 404. In further implementations, the device registration system 120 can control the number of new devices with relation to the device reputation of the acting member device. In yet further implementations, the device registration system 120 can apply the device reputation as weight for a vote, as part of a voting system. The device registration system 120 can further use behavior of the requesting device in determining if the stake of the acting member device is lost or if stake is gained.

In this example, the device registration system 120 accesses the blockchain registry 260 and determines that the first member device 406, the second member device 408, and the external system 414 can serve as the acting member devices for the first requesting device 404. Further, the device registration system 120 determines that the first member device 406, the second member device 408, the third member device 410, and the external system 414 can serve as the acting member devices for the second requesting device 412. In making this determination, the device registration system 120 can determine that the first member device 406 has a reputation of two (2), the second member device 408 has a reputation of seven (7), the third member device 410 has a reputation of three (3), and the external system 414 has a reputation of four (4). Further, the device registration system 120 can determine that the first requesting device 404 has never attempted to connect to the network and that the second requesting device 412 has attempted to connect to the network once before. The device registration system 120 can then record the current connection requests for the first requesting device 404 and the second requesting device 412 in the blockchain registry 260. The device registration system 120 then can rehash the blockchain registry 260 and redistribute the blockchain registry 260 to one or more of the devices connected to the network 400.

The device registration system 120 can then produce an approval threshold for the first requesting device 404 in the second requesting device 412. In determining the approval threshold, the device registration system 120 can access the blockchain registry 260, the query information 270, and the resource data 280. The resource data 280 can provide information regarding various physical characteristics and limitations of the network, such as the network capacity, current network load, compatible protocols (both between devices and between the network and the requesting device), and other information regarding the devices connected to the network 400 as well as the network 400. As well, the blockchain registry 260 can include individualized requirements regarding the member devices, such as the first member device 406, the second member device 408, and the third member device 410. Individualized requirements, as described above, can include specific desired limitations for the individual member devices. Thus, the approval threshold is a weighted balance of system interests, which can include network capability, input from member devices, known information regarding the requesting devices, and the likelihood of malicious activity.

Further, the level of the approval threshold can be used as an initial indicator of information regarding the device behavior available to the device registration system 120. A low approval threshold can relate to a determination that there is no reason that the device registration system 120 recognizes to deny the device. Whereas, a high approval threshold can relate to a determination that there are one or more reasons for the device registration system 120 to believe that the requesting device may be malicious on the network 400. In this example, the device registration system 120 can determine that the first requesting device 404 has an approval threshold of one (1). An approval threshold of one (1) can indicate that a single vote, regardless of reputation to approve the first requesting device 404, will result in approval of a device interaction for the first requesting device 404. Further, in this example, the device registration system 120 can determine that the second requesting device 412 has an approval threshold of ten (10). An approval threshold of ten (10) can indicate that either a high reputation, multiple approving inputs, or combinations thereof can be required to approve the second requesting device 412.

The device registration system 120 can further receive input from the acting member devices within the network 400. Regarding the first requesting device 404, the first member device 406, the second member device 408, and the external system 414 can provide input that the first requesting device 404 is approved for connecting to to the network 400. This determination can include information on the first requesting device 404, such as the device manufacturer, the type of device, the limits of the network request, and others that would tend to indicate the behavior of said device. Regarding the second requesting device 412, the first member device 406 and the third member device 410 can provide input to approve connecting to to the network 400. On the same request, the external system 414 can provide no input regarding the second device 412. The second member device 408 can determine that the second requesting device 412 is malicious and provide an input of denial with prejudice. The device registration system 120 can then further update the blockchain registry 260, as described above, with the inputs received from the various devices on the network 400.

Using the above exemplary numerical input in the exemplary numerical approval threshold, the device registration system 120 can determine if the input received results in allowing the device to communicate with the network 400. With consideration of the first requesting device 404, the acting member devices provided approval input, with the first member device 406 having a reputation of two (2), the second member device 408 having a reputation of seven (7), and the external system 414 having a reputation of four (4). As the first requesting device 404 has an approval threshold of one (1), the combination of the acting member devices providing thirteen (13) is sufficient to approve the connection request and allow the first requesting device 404 on the network 400. With consideration of the second requesting device 412, the acting member devices provided both approval and denial input. For the approval input, the acting member devices included the first member device 406 with a reputation of two (2) and the third member device 410 with a reputation of three (3). For the denial input, the acting member devices included the external system 414 with a reputation of four (4) and the second member device 408 with a reputation of seven (7). As the second requesting device 412 has an approval threshold of ten (10), the second requesting device can be denied, as the total approval input is five (5) and the total denial input is seven (7). The nonresponsive acting member device can be considered a denial input. In one or more implementations, a denial input by nonresponse can be treated as not contributing reputation to the connection request. In this case, the second requesting device 412 can be denied connection to to the network 400. The device registration system 120 can then record the first requesting device 404 in the blockchain registry 260 as a member device within the network 400. The device registration system 120 can further record the second requesting device 412 in the blockchain registry 260 as being denied connection to the network 400.

The device registration system 120 can then monitor the network 400 and the vehicle 402 device behavior from the first requesting device 404. The device registration can use one or more techniques to determine faults or events that relate to device behavior from the first requesting device 404. In this example, the first requesting device 404 produces one or more negative device behaviors, such as a Byzantine fault on the timing synchronization request from the member devices. The one or more negative device behaviors can be detected by the device registration system 120 and/or one or more of the member devices 406, 408, and 410. The one or more negative device behaviors, as well as other device behaviors, can then be incorporated by the device registration system 120 into the overall device behavior of the first requesting device 404.

The device registration system 120 can then incorporate the device behavior into a device disposition for the first requesting device 404. The device disposition for the first requesting device 404 is an overall characterization of the device behavior over a period of time or as established by a specific device behavior. In one example, the first requesting device 404 performs a device behavior which unequivocally indicates that the device is a malicious device, such as by performing an attack on one of the member devices. In this example, the first requesting device 404 can be established by a single event as having a device disposition of a malicious device. In another example, the first requesting device 404 performs one or more device behaviors which cumulatively or viewed in an overall fashion indicate the device disposition as being that of a malicious device. The device registration system 120 can then cancel the registration of the first requesting device 404 as well as incorporate the device disposition into the blockchain registry 260.

As well, the device registration system 120 can incorporate reputation (e.g., device reputation and member device reputation) for both the first requesting device 404 as well as any acting member devices which approved the first requesting device 404. In this case, the first member device 406, the second member device 408, and the external system 414 can all be negatively compensated for approving the first requesting device 404 to access the network 400. In one example, the negative compensation can be a reduction in reputation for each of the acting member devices. In one or more implementations, member device reputation and device reputation can be distinguished within the blockchain registry 260. In one or more implementations, the member devices 406, 408 and 410 can have a member device reputation citing approval or denial of device requests to the network 400 and a device reputation reflecting the behavior of the member device on the network 400.

Through the above implementation of the device registration system 120, the network 400 can appropriately control network access to a variety of new devices providing the benefits of the distributed system with the reliability of the centralized system. The device registration system 120, as described herein, can increase the overall reliability of acceptance of requesting devices by distributing the responsibility to other member devices. The device registration system 120 can allow for distribution of the responsibility for accepting the requesting device into the network 400. As well, the device registration system 120 can reward network members for preventing malicious devices from accessing the network. Further, the device registration system 120 can create a distributed and robust network registry capable of long-term device monitoring and approval.

Figure 5:
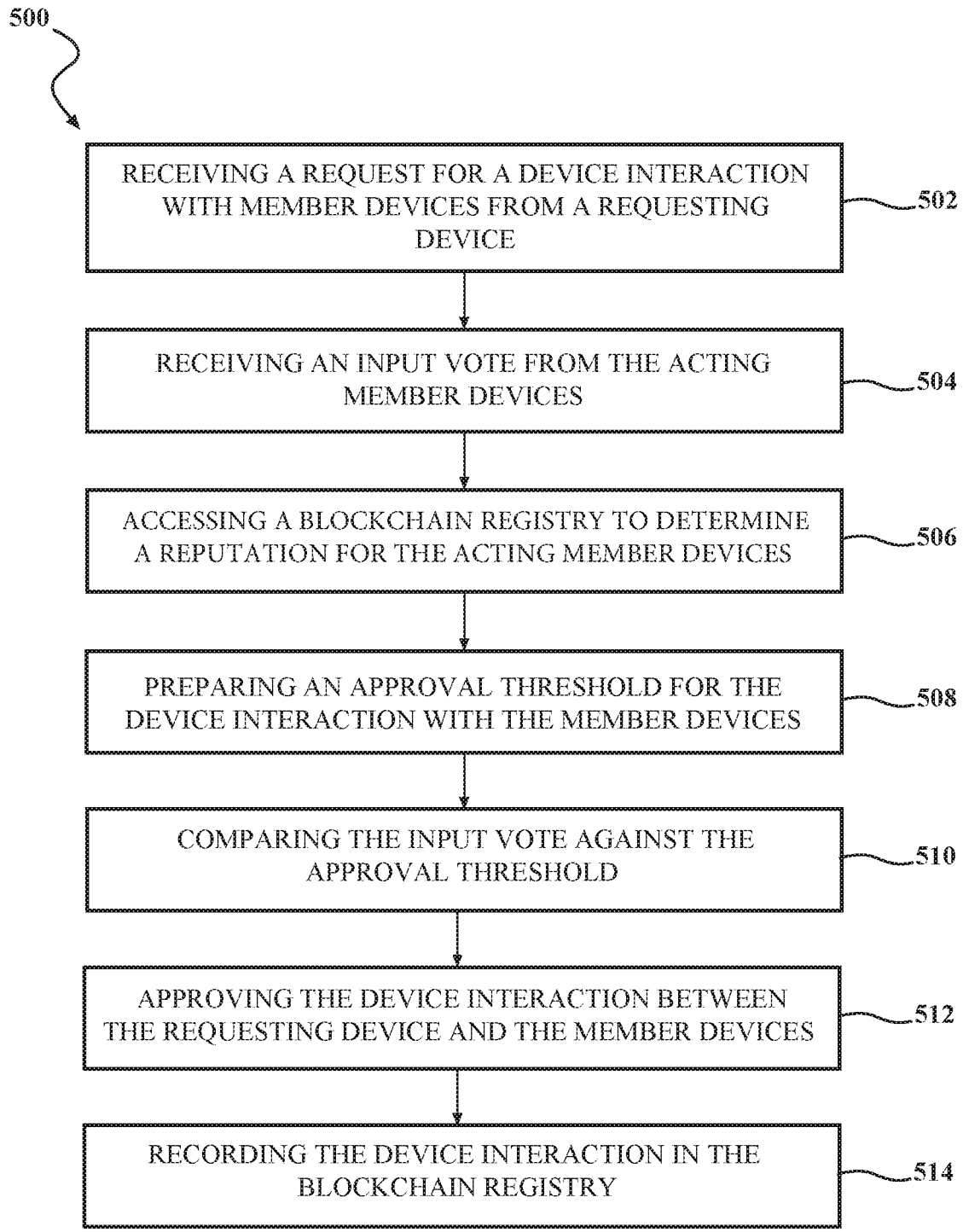
FIG. 5 is a flow diagram of a method for reputation-based device communication, according to one or more implementations.

FIG. 5 is a flow diagram of a method 500 for reputation-based device communication, according to one or more implementations. The method 500 can provide a robust, non-centralized, and immutable device registry capable of incorporating reputation in approving or denying the connection request from a requesting device. Thus, the method 500 provides a variety of benefits for timing and access to sensitive devices in a network. The method 500 can include receiving a request for a device interaction with one or more member devices from a requesting device, at 502. An input vote can then be received from one or more acting member devices of the one or more member devices, at 504. A blockchain registry can then be accessed to determine a reputation for at least one of the acting member devices, at 506. An approval threshold can be prepared for the device interaction with the one or more member devices, at 508. The input vote can then be compared against the approval threshold in light of the reputation, at 510. In response to achieving the approval threshold, the device interaction between the requesting device and the one or more member devices can be approved, at 512. The device interaction can then be recorded in the blockchain registry, at 514.

The method 500 can include receiving a request for a device interaction with one or more member devices from a requesting device, at 502. The requesting device can attempt to communicate with the network through one or more connection types, such as a wired connection or a wireless connection. The requesting device can attempt to communicate with the network impromptu or in response to a query. In one or more implementations, the requesting device can send out a broadcast packet announcing the presence of the one or more requesting devices on the network and requesting network access. In one or more further implementations, the method 500 can broadcast a request for assignment in the network. In this case, the requesting device can respond to the request for assignment and the network, present key identifying information such as a MAC address, and await further evaluation by the device registration system 120.

The method 500 can then store the request for a device interaction (i.e., the connection request) and related information based on the characteristics of the requesting device. To store the request for a device interaction, the method 500 can include modifying the blockchain database in a blockchain registry, such as the blockchain registry 260 described with reference to FIG. 2. The blockchain database and blockchain registry can be modified in a substantially similar manner as the blockchain registry 260, described above with reference to FIG. 2. The blockchain database can then be distributed to one or more devices throughout the network for later use. The method 500 can further determine that the requesting device has previously accessed the network and store the request for a device interaction with relation to the block establishing previous access. In another implementation, the method 500 can determine that the requesting device has never accessed the network.

In one or more embodiments, the receiving of the connection request can be included as part of a system, such as the device registration system 120 described with reference to FIG. 2. The device registration system 120 can include the communication module 220. The communication module 220 can generally include instructions that function to control the processor 104 to receive a request for a device interaction from a requesting device. In one or more embodiments, the device registration system 120 reviews the blockchain registry 260 for previous network interactions from the requesting devices. The connection request from the one or more requesting devices can be stored as part of the blockchain registry 260, query information 270, or both, in the database 210. The request for device interaction can be stored as part of query information 270, shown as part of the database 210. The query information 270 or components thereof can be incorporated into the blockchain registry 260 based on input-related information as described herein.

An input vote can be received from one or more acting member devices of the one or more member devices, at 504. The input votes can include approving the request, denying the request, conditionally approving/denying the request, requests for further information, accepting/denying portions of the request, or others. The input votes can be interactive inputs, autonomous input, or other forms of input as desired. The input votes can be associated with and weighted by the member device reputation of the one or more acting member devices. The member device reputation can include previous approval of malicious requesting devices, previous approval of benign requesting devices, industry status of the manufacturer, number of related devices in the network, and others which tend to indicate the trustworthiness of the acting member device.

In one or more embodiments, the receiving of inputs from the acting member devices can be included as part of a system, such as the device registration system 120 described with reference to FIG. 2. The device registration system 120 can include the communication module 220. The communication module 220 can generally include instructions that function to control the processor 104 to receive input votes regarding the approval from at least one of the one or more acting member devices. The inputs can be stored as part of the blockchain registry 260, as shown in the database 210.

A blockchain registry can then be accessed to determine a reputation for at least one of the acting member devices, at 506. The blockchain registry can contain information regarding one or more member devices and one or more acting member devices for the member devices. The method 500 can query the blockchain registry to determine if the requesting device has pre-established network access, information regarding network control and monitoring, acting member devices and member device reputation, member devices and device reputation, and others related to the device registry. The blockchain registry can be substantially similar to the blockchain registry 260, described with reference to FIG. 2. The method 500 can further incorporate one or more acting member devices and one or more member devices in the determination of appropriate network access for the requesting device. Acting member devices can include manufacturers (e.g., a control system or monitoring system for device makers, vehicle makers, network owners, or others), member devices, third-system evaluators (e.g., a monitoring system designed for network and device evaluation), and others. Member devices can include any network-connected computer or vehicle device, such as sensors, communications components, control systems, steering systems, braking system components, and/or other components which can communicate with or engage with a network.

In one or more embodiments, the accessing of the blockchain registry can be included as part of a system, such as the device registration system 120 described with reference to FIG. 2. The device registration system 120 can include the evaluation module 230. The evaluation module 230 can generally include instructions that function to control the processor 104 to access a blockchain registry in response to the request. In one or more embodiments, the evaluation module 230 can query the blockchain registry 260 regarding the requesting device, one or more acting member devices, pre-established network access, or others. The blockchain registry 260 can be stored in a centralized location, such as the server 150, or distributed across a network, such as the network 140, to one or more computing devices. In one implementation, the blockchain registry 260 can be stored as part of one or more of the member devices.

An approval threshold can be prepared for the device interaction with the one or more member devices, at 508. The approval threshold, as described above, refers to the one or more requirements placed by the network, one or more member devices, and/or one or more acting member devices on network access from one or more requesting devices. In some implementations, the approval threshold can include a composition threshold and a reputation threshold. The approval threshold can further include network limitations as related to the connection request. The method 500 can further determine a variety of network requirements and network resources as allocated to currently member devices in determining the approval threshold for the requesting device.

The method 500 can further set individualized restrictions on the approval threshold for the member devices. The method 500 can further maintain the individualized restrictions on the approval threshold even if the requesting device is approved for network access. In one or more examples, the method 500 can approve the requesting device c for general network access but not access to one or more specific member devices based on the individualized restrictions. Individualized restrictions can include reputation level for the requesting device, reputation level for the one or more acting member devices approving the requested device, number of previous attempts at network access, or others which can be selected for individual devices or groups of devices.

In one or more embodiments, the creation of the approval threshold can be included as part of a system, such as the device registration system 120 described with reference to FIG. 2. The device registration system 120 can include the evaluation module 230. The evaluation module 230 can generally include instructions that function to control the processor 104 to create an approval threshold for the approval of the connection request. The network limitations can be stored as part of the resource data 280, as shown in the database 210. The evaluation module 230 can further access the resource data 280 determine a variety of network requirements and network resources as allocated to currently member devices in determining the approval threshold for the requesting device. Individualized restrictions can be stored as part of the blockchain registry 260, shown in the database 210.

The input vote can then be compared against the approval threshold in light of the reputation, at 510. In one or more implementations, the input votes can indicate approval or denial for the requesting device. The method 500 can compare the input votes indicating approval to the approval threshold to determine if the requesting device will be allowed on the network. In one or more implementations, the input votes including both the number of inputs which indicate approval and the reputation of the acting member device indicating approval can be applied to determine if the approval threshold has been met. In one or more implementations, the method 500 can assign the input a general value based on known parameters of the acting member device, such as member device reputation, system stake in the successful integration of the requesting device, or others. In further implementations, the method 500 can weight inputs denying access (e.g., an input of denial with prejudice) against inputs approving access. The input of denial with prejudice can be given a value which is weighed against the input of approval in determining whether the connection request is approved. As such, intentional denial of access by the acting member device can result in denying the connection request, even if the connection request would otherwise have been approved by the approving acting member devices.

In response to achieving the approval threshold, the device interaction between the requesting device and the one or more member devices can be approved, at 512. The method 500 can review the input to determine approval in light of the approval threshold. The method 500 can subsequently allow the requesting device to connect to the network and establish various device interaction components, such as an IP address, set device restrictions based on network restrictions, establish connection limitation based on individualized restrictions, and others. The method 500 can further inform the member devices of the approved requesting device. The method 500 can further include controlling the level of interaction based on proof of stake. Proof of stake is described above with reference to FIG. 2. The stake of the acting member device can control the amount or type of vote that the member device has in allowing a device interaction, including a network connection, to a requesting device. In some implementations, the reputation of the acting member devices can be staked on the device interaction.

In one or more embodiments, the interaction of the requesting device with a member device can be included as part of a system, such as the device registration system 120 described with reference to FIG. 2. The device registration system 120 can include the coordination module 240. The coordination module 240 can generally include instructions that function to control the processor 104 to receive input votes regarding the approval from at least one of the one or more acting member devices. The inputs can be stored as part of the blockchain registry 260, as shown in the database 210.

The device interaction can then be recorded in the blockchain registry, at 514. Once approval is determined, the method 500 can record the determination of approval as a new block in the blockchain registry. The new block can be then be rehashed and distributed to others in the network for insertion into the blockchain registry. The new block can then be verified, and integrated into the blockchain registry, and/or concatenated with or resolved against other blockchain registries in the network to maintain the integrity of the blockchain registry as distributed throughout the network.

The method 500 can include instructions to store the inputs approving access or denying access with prejudice as part of the member device reputation in the blockchain registry 260. The member device reputation can include both the inputs which approve access by a requesting device and the number of overall approvals received from the acting member device. In one or more implementations, member device reputation can be negatively affected by a large number of overall approvals, approving access to a malicious requesting device, combinations thereof, or others. The member device reputation of the acting member device which approves access to a malicious requesting device can be negatively affected, such as by reducing reputation affecting a level of electronic currency, limiting numbers of denial with prejudice that the system can present, or others. Conversely, the member device reputation of the acting member device which approves access to a benign requesting device can be positively affected, such as by increasing reputation, increasing electronic currency, offering special weight to certain types of approvals, or others.

In one or more further implementations, the inputs denying access with prejudice can help or damage member device reputation in a similar manner. Inputs denying access with prejudice can be considered the negative of inputs approving access. As such, the member device reputation of the acting member device which denies access with prejudice to a benign requesting device can be negatively affected, such as by reducing reputation affecting a level of electronic currency, limiting numbers of denial with prejudice that the system can present, or others. Conversely, the member device reputation of the acting member device which denies access with prejudice to a malicious requesting device can be positively affected, such as by increasing reputation, increasing electronic currency, offering special weight to certain types of denials, or others.

In one or more embodiments, the recording of the device interaction in the blockchain and subsequent distribution can be included as part of a system, such as the device registration system 120 described with reference to FIG. 2. The device registration system 120 can include the coordination module 240. The coordination module 240 can generally include instructions that function to control the processor 104 to record the approval and device interaction as part of the blockchain registry 260, as shown in the database 210.

In one or more further implementations, the method 500 can further include receiving information regarding the device behavior. The method 500 can use one or more sources to collect the information, such as sensors, collected network traffic from the requesting device, reports from other member devices, or other indications of benign or malicious activity. The method 500 can then assess the device behavior, both positive and negative, and determine the device disposition. The device disposition is a generalized statement or numerical indicator which indicates an assessment of the overall behavior of the device. The device disposition can be device/network specific or generalized to all behavior from the device as known to the blockchain registry 260. The device disposition can be associated with device reputation and with member device reputation.

In one or more further implementations, the method 500 can provide compensation to the one or more acting member devices in light of device disposition and status of their input. The method 500 can use the device disposition to determine whether the compensation provided should be a negative compensation or positive compensation as described above. The compensation described herein can include electronic currency, reputation, special control levels over the network, or others. In one implementation, the compensation can be proportional to the type of input, viewing the use of reputation as a wager on the maliciousness of the requesting device. In another implementation, the compensation can be proportional to the resulting device disposition, where the level of negativity or positivity of the device disposition affects the quantity of compensation, such as reputation gains or losses.

FIG. 1 will now be discussed in full detail as an example computing device within which the system and methods disclosed herein may operate. In some implementations, the computing device 100 can be a server connected with a display device 130. While arrangements will be described herein with respect to servers, it will be understood that implementations are not limited to servers. In some implementations, the computing device 100 can be any other form of computing device that, for example, can receive data transmissions from one or more vehicles, send data transmissions to one or more vehicles, and can benefit from the functionality of the device registration system discussed herein. In further implementations, the computing device 100 can be integrated into one or more vehicle, such as to perform one or more of the functions described herein and/or to benefit from the functionality of the device registration system discussed herein.

The computing device 100 can have an input 102 for obtaining environmental information for communication with other computing devices. The input 102 can include one or more connections for an input device to the computing device 100. The input 102 can be wired or wireless. The input 102 can be any suitable communication interface depending on device type and include, but is not limited to, USB (universal serial bus), Lightning, frame grabber, Ethernet, or Firewire. The computing device 100 further comprises a processor 104, such as a general purpose processor, for use in the data processing and analysis described herein. The processor 104, which can also be referred to as a central processing unit (CPU), can be a device which is capable of receiving and executing one or more instructions to perform a task as part of a computing device. In one implementation, the processor 104 can include a microprocessor such as an application-specific instruction set processor (ASIP), a graphics processing unit (GPU), a physics processing unit (PPU), a DSP, an image processor, a co-processor, or others. Though referenced as the processor 104, it is understood that one or more processors 104 can be used in one or more implementations described herein, including combinations of processors 104.

The computing device 100 can further comprise some volatile or non-volatile memory, such as memory 106. The memory 106 can include volatile and/or non-volatile memory. Examples of suitable memory 106 include RAM, flash memory, ROM, PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The memory 106 can be a component of the processor(s) 104, or the memory 106 can be operably connected to the processor(s) 104 for use thereby. The memory 106 can include one or more modules that include computer-readable instructions that, when executed by the processor 104, cause the processor 104 to perform methods and functions that are discussed herein. The memory 106 can include a database 210, described with reference to FIG. 2. The memory 106 can include information related to a reference material for comparison and/or analysis purposes. The computing device 100 can also include output connection 108 for conveying output in a fashion which is usable by a vehicle, a requesting device, the connected device, or a user. In one example, the output connection 108 conveys output to a screen for convenient viewing (e.g., display device 130) or to a control device.

In some implementations, the input 102 can be connected with one or more sensors 110, or other active or passive input devices or systems. "Sensor" can include any device, component and/or system that can detect, and/or sense something. The one or more sensors 110 can be configured to detect, and/or sense in real-time. As used herein, the term "real-time" means a level of processing responsiveness that a user or system senses as sufficiently immediate for a particular process or determination to be made, or that enables the processor to keep up with some external process. In some implementations, the one or more sensors 110 can include a plurality of sensors. The plurality of sensors can function independently from each other. Alternatively, two or more of the sensors can work in combination with each other. In further implementations, the two or more of the plurality of sensors can form a sensor network. The one or more sensors 110 can be operably connected to the processor(s) 104, the memory 106, and/or another element of the computing device 100 (including any of the elements shown in FIG. 1).

The computing device 100 can further include the device registration system 120 or components thereof. The device registration system 120 can be implemented in operative connection with the computing device 100 to perform methods and other functions as disclosed herein relating to reputation-based device communications. The device registration system 120 can include a plurality of modules to perform the functions described herein, including a communication module 220, an evaluation module 230 and a coordination module 240. In one or more implementations, the device registration system 120 can communicate via a wired or wireless connection, depicted as the network 140, with local or remote devices, such as to receive information regarding the requesting device, connected devices, acting member devices, or others. In one or more implementations, the device registration system 120 can communicate with a vehicle, with a server 150, with another computing device 100, or combinations thereof. Further, the device registration system 120 can affect communication within the computing device 100, such as between one or more connected devices to correlate registration parameters and functionality as discussed herein. The device registration system 120 can be in communication with the blockchain registry to approve and assign the connection between the one or more requesting devices, the one or more connected devices, and/or a vehicle to provide an established connection, as described herein.

Detailed implementations are disclosed herein. However, it is to be understood that the disclosed implementations are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various implementations are shown in FIGS. 1-5, but the implementations are not limited to the illustrated structure or application.

The flowcharts and block diagrams in the figures illustrate the architecture, functionality, and operation of possible implementations of systems, methods, and computer program products according to various implementations. In this regard, each block in the flowcharts or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession can be executed substantially concurrently, or the blocks can sometimes be executed in the reverse order, depending upon the functionality involved.

The systems, components and/or methods described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or methods also can be embedded in a computer-readable storage, such as a computer program product or other data programs storage device, readable by a machine, tangibly embodying a program of instructions executable by the machine to perform methods and methods described herein. These elements also can be embedded in an application product which comprises all the features enabling the implementation of the methods described herein and, which when loaded in a processing system, is able to carry out these methods.

Furthermore, arrangements described herein can take the form of a computer program product embodied in one or more computer-readable media having computer-readable program code embodied or embedded, such as stored thereon. Any combination of one or more computer-readable media can be utilized. The computer-readable medium can be a computer-readable signal medium or a computer-readable storage medium. The phrase "computer-readable storage medium" means a non-transitory storage medium. A computer-readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a RAM, a ROM, an EPROM or Flash memory, an optical fiber, a portable compact disc read-only memory (CD-ROM), a digital versatile disc (DVD), an optical storage device, a magnetic storage device, or any suitable combination of the foregoing. In the context of this document, a computer-readable storage medium can be any tangible medium that can contain, or store a program for use by or in connection with an instruction execution system, apparatus, or device.

Program code embodied on a computer-readable medium can be transmitted using any appropriate medium, including but not limited to wireless, wireline, optical fiber, cable, RF, etc., or any suitable combination of the foregoing. Computer program code for carrying out operations for aspects of the present arrangements can be written in any combination of one or more programming languages, including an object-oriented programming language such as Java™, Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer, or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider).

In the description above, certain specific details are outlined in order to provide a thorough understanding of various implementations. However, one skilled in the art will understand that the invention may be practiced without these details. In other instances, well-known structures have not been shown or described in detail to avoid unnecessarily obscuring descriptions of the implementations. Unless the context requires otherwise, throughout the specification and claims which follow, the word "comprise" and variations thereof, such as, "comprises" and "comprising" are to be construed in an open, inclusive sense, that is, as "including, but not limited to." Further, headings provided herein are for convenience only and do not interpret the scope or meaning of the claimed invention.

Reference throughout this specification to "one or more implementations" or "an implementation" means that a particular feature, structure or characteristic described in connection with the implementation is included in at least one or more implementations. Thus, the appearances of the phrases "in one or more implementations" or "in an implementation" in various places throughout this specification are not necessarily all referring to the same implementation. Furthermore, the particular features, structures, or characteristics may be combined in any suitable manner in one or more implementations. Also, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings (such as "Background" and "Summary") and sub-headings used herein are intended only for general organization of topics within the present disclosure and are not intended to limit the disclosure of the technology or any aspect thereof. The recitation of multiple implementations having stated features is not intended to exclude other implementations having additional features, or other implementations incorporating different combinations of the stated features. As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an implementation can or may comprise certain elements or features does not exclude other implementations of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an implementation or particular system is included in at least one or more implementations or aspect. The appearances of the phrase "in one aspect" (or variations thereof) are not necessarily referring to the same aspect or implementation. It should also be understood that the various method steps discussed herein do not have to be carried out in the same order as depicted, and not each method step is required in each aspect or implementation.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as including (i.e., open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

The preceding description of the implementations has been provided for purposes of illustration and description. It is not intended to be exhaustive or to limit the disclosure. Individual elements or features of a particular implementation are generally not limited to that particular implementation, but, where applicable, are interchangeable and can be used in a selected implementation, even if not specifically shown or described. The same may also be varied in many ways. Such variations should not be regarded as a departure from the disclosure, and all such modifications are intended to be included within the scope of the disclosure.

While the preceding is directed to implementations of the disclosed devices, systems, and methods, other and further implementations of the disclosed devices, systems, and methods can be devised without departing from the basic scope thereof. The scope thereof is determined by the claims that follow.

What is claimed is:

1. A device registration system for reputation-based device communication, comprising:
    one or more processors; and
    a memory communicably coupled to the one or more processors and storing:
        a communication module including instructions that when executed by the one or more processors cause the one or more processors to receive a request for a device interaction with one or more member devices from a requesting device, and to receive an input vote from one or more acting member devices of the one or more member devices;
        an evaluation module including instructions that when executed by the one or more processors cause the one or more processors to access a blockchain registry to determine a reputation for at least one of the acting member devices, and to prepare an approval threshold for the device interaction with the one or more member devices; and
        a coordination module including instructions that when executed by the one or more processors cause the one or more processors to, in response to determining the input vote satisfies the approval threshold, approve the device interaction between the requesting device and the one or more member devices, the reputation of the acting member devices being staked on the device interaction, and to record the device interaction in the blockchain registry.

2. The device registration system of claim 1, wherein recording the device interaction includes recording at least one of the request, the input vote, and the approval threshold.

3. The device registration system of claim 1, wherein the evaluation module further comprises instructions to compare the input vote against the approval threshold in light of the reputation, wherein the approval threshold is a combination of the input vote and the reputation which indicate approval of the device interaction.

4. The device registration system of claim 1, wherein the coordination module further comprises instructions to receive information regarding a device behavior of the requesting device from the one or more member devices, and to determine a device disposition using the device behavior.

5. The device registration system of claim 4, wherein the coordination module further comprises instructions to compensate the one or more acting member devices in light of the device disposition and the input vote.

6. The device registration system of claim 4, wherein the coordination module further comprises instructions to modify one or more communication parameters for the device interaction in light of device disposition and/or member device reputation.

7. The device registration system of claim 1, wherein the approval threshold includes at least one of a member device composition threshold and a member device reputation threshold.

8. A non-transitory computer-readable medium for reputation-based device communication and storing instructions that when executed by one or more processors cause the one or more processors to:
receive a request for a device interaction with one or more member devices from a requesting device;
receive an input vote from one or more acting member devices of the one or more member devices;
access a blockchain registry to determine a reputation for at least one of the acting member devices;
prepare an approval threshold for the device interaction with the one or more member devices;
in response to determining the input vote satisfies the approval threshold, approve the device interaction between the requesting device and the one or more member devices, the reputation of the acting member devices being staked on the device interaction; and
record the device interaction in the blockchain registry.

9. The non-transitory computer-readable medium of claim 8, wherein recording the device interaction includes recording at least one of the request, the input vote, and the approval threshold.

10. The non-transitory computer-readable medium of claim 8, further comprising instructions to compare the input vote against the approval threshold in light of the reputation, wherein the approval threshold is a combination of the input vote and the reputation which indicate approval of the device interaction.

11. The non-transitory computer-readable medium of claim 8, further comprising instructions to receive information regarding a device behavior of the requesting device from the one or more member devices, and to determine a device disposition using the device behavior.

12. The non-transitory computer-readable medium of claim 11, further comprising instructions to compensate the one or more acting member devices in light of the device disposition and the input vote.

13. The non-transitory computer-readable medium of claim 11, further comprising instructions to modify the device interaction in response to at least one of device disposition and member device reputation.

14. The non-transitory computer-readable medium of claim 8, wherein the approval threshold includes at least one of a member device composition threshold and a member device reputation threshold.

15. A method for reputation-based device communication, comprising:
receiving a request for a device interaction with one or more member devices from a requesting device;
receiving an input vote from one or more acting member devices of the one or more member devices;
accessing a blockchain registry to determine a reputation for at least one of the acting member devices;
preparing an approval threshold for the device interaction with the one or more member devices;
in response to determining the input vote satisfies the approval threshold, approving the device interaction between the requesting device and the one or more member devices, the reputation of the acting member devices being staked on the device interaction; and
recording the device interaction in the blockchain registry.

16. The method of claim 15, further comprising modifying the blockchain registry by recording at least one of the request, the input vote, and the approval threshold as an entry in a blockchain shared amongst the member devices of the blockchain registry.

17. The method of claim 16, wherein recording the device interaction including the input vote into the blockchain contributes to the reputation that indicates whether the device is trustworthy according to a history of interactions tracked by the blockchain.

18. The method of claim 15, wherein recording the device interaction further includes receiving and recording in the blockchain information regarding one or more device behaviors of the requesting device from the one or more member devices, and determining a device disposition using at least the device behavior.

19. The method of claim 18, further comprising compare the input vote against the approval threshold in light of the reputation, wherein the approval threshold is a combination of the input vote and the reputation which indicate approval of the device interaction.

20. The method of claim 18, further comprising modifying the device interaction in response to at least one of device disposition and a member device reputation, wherein modifying the device interaction includes one or more of providing tiered access/trust.

* * * * *